US009183064B2

(12) United States Patent
Ahmed et al.

(10) Patent No.: US 9,183,064 B2
(45) Date of Patent: Nov. 10, 2015

(54) INTELLIGENT MEDIATION OF MESSAGES IN A HEALTHCARE PRODUCT INTEGRATION PLATFORM

(75) Inventors: Rizwan Ahmed, Bangalore (IN); Vishal Vijayan, Bangalore (IN)

(73) Assignee: General Electric Company, Schenectady, NY (US)

( * ) Notice: Subject to any disclaimer, the term of this patent is extended or adjusted under 35 U.S.C. 154(b) by 842 days.

(21) Appl. No.: 13/399,534

(22) Filed: Feb. 17, 2012

(65) Prior Publication Data

US 2013/0173719 A1 Jul. 4, 2013

(30) Foreign Application Priority Data

Dec. 30, 2011 (IN) .......................... 4660/CHE/2011

(51) Int. Cl.
*H04L 29/08* (2006.01)
*G06F 9/54* (2006.01)

(52) U.S. Cl.
CPC ................ *G06F 9/541* (2013.01); *H04L 67/12* (2013.01)

(58) Field of Classification Search
CPC ................................ H04L 67/12; G06F 9/541
See application file for complete search history.

(56) References Cited

U.S. PATENT DOCUMENTS 5,524,253 A * 6/1996 Pham et al. .................. 709/202
6,721,747 B2 * 4/2004 Lipkin .......................... 709/209
6,850,893 B2 * 2/2005 Lipkin et al. ................ 705/7.11
7,331,049 B1 * 2/2008 Jin ................................ 719/314
7,908,293 B2 * 3/2011 Aronson et al. .............. 707/791
8,769,127 B2 * 7/2014 Selimis et al. ................ 709/229
2002/0049749 A1 * 4/2002 Helgeson et al. ................ 707/3
2002/0073236 A1 * 6/2002 Helgeson et al. ............. 709/246
2003/0037263 A1 * 2/2003 Kamat et al. .................. 713/202
2003/0216938 A1 11/2003 Shour
2004/0046982 A1 * 3/2004 Jeyachandran et al. ...... 358/1.13
2004/0101186 A1 * 5/2004 Tong et al. .................... 382/132
2005/0246205 A1 11/2005 Wang et al.
2005/0262229 A1 * 11/2005 Gattu et al. ................... 709/223
2007/0203753 A1 8/2007 Hasan et al.
2007/0282951 A1 * 12/2007 Selimis et al. ............... 709/205
2008/0004904 A1 1/2008 Tran
2008/0046292 A1 2/2008 Myers et al.
2008/0270180 A1 10/2008 Sholtis et al.
2008/0270438 A1 * 10/2008 Aronson et al. .............. 707/101
2009/0080408 A1 * 3/2009 Natoli et al. .................. 370/351
2009/0240526 A1 9/2009 Vesto et al.
2009/0307755 A1 * 12/2009 Dvorak et al. .................... 726/4
2010/0145728 A1 * 6/2010 Azancot ............................ 705/3
2010/0228559 A1 9/2010 Boone
2011/0119088 A1 * 5/2011 Gunn ................................ 705/3
2011/0295616 A1 * 12/2011 Vesto ............................... 705/3
2012/0250688 A1 * 10/2012 Ye et al. ........................ 370/392

* cited by examiner

*Primary Examiner* — Jimmy H Tran
(74) *Attorney, Agent, or Firm* — Hanley, Flight and Zimmerman, LLC

(57) ABSTRACT

An example method to mediate messages in a product integration platform includes receiving a message request from a source healthcare system where the message request contains a message payload. The example method includes determining an interface to be used to route the message to a target healthcare system. The example method includes creating a platform message based on the message request. The example method includes adapting the platform message into a message format expected by the interface and routing the platform message to the interface.

22 Claims, 11 Drawing Sheets

INTELLIGENT MEDIATION OF MESSAGES IN A HEALTHCARE PRODUCT INTEGRATION PLATFORM

RELATED APPLICATIONS

This patent claims priority to Indian Patent Application No. 4660/CHE/2011, filed Dec. 30, 2011, which is hereby incorporated by reference herein in its entirety.

FEDERALLY SPONSORED RESEARCH OR DEVELOPMENT

Not Applicable

MICROFICHE/COPYRIGHT REFERENCE

Not Applicable

BACKGROUND

Healthcare environments, such as hospitals or clinics, include information products and/or systems. Healthcare information systems may include, for example, hospital information systems (HIS), radiology information systems (RIS), clinical information systems (CIS), and cardiovascular information systems (CVIS), and storage systems, such as picture archiving and communication systems (PACS), library information systems (LIS), and electronic medical records (EMR). Information stored may include patient medication orders, medical histories, imaging data, test results, diagnosis information, management information, and/or scheduling information, for example.

Often times, these healthcare information systems will be required to communicate to provide higher quality healthcare services with increased efficiency. However, many healthcare information systems operate using various message exchange standards and/or protocols that may make system integration and/or communication more difficult.

BRIEF SUMMARY

Certain examples provide methods, systems, and tangible computer-readable media to mediate messages in a product integration platform. An example method to mediate messages in a product integration platform includes receiving a message request from a source healthcare system where the message request contains a message payload. The example method includes determining an interface to be used to route the message to a target healthcare system. The example method includes creating a platform message based on the message request. The example method includes adapting the platform message into a message format expected by the interface and routing the platform message to the interface.

Another example method to mediate messages in a product integration platform includes receiving a request message from an integration platform where the request message being received is in a canonical data format. The example method includes denormalizing the request message into an interface request message format. The interface request message format corresponds to a message format implemented by an interface. The example method includes translating the request message from the interface request message format into a target healthcare system format and sending the request message to the target healthcare system. The target healthcare system format corresponds to a message format implemented by a target healthcare system and the interface is associated with the target healthcare system.

An example method to provision an interface for mediation of messages in a product integration platform includes identifying a target healthcare system, wherein the target healthcare system is a destination for message routing. The example method includes identifying configuration rules and protocol requirements for the target healthcare system. The example method includes defining a configuration for the interface associated with the target healthcare system and constructing the target healthcare system interface route. The example method includes creating an interface factory to return implementations of an interface route and configuration. The example method includes passing the interface factory content to an interface control channel and loading concrete implementations of the interface route and configuration. The example method includes initializing the interface route and instantiating interface endpoints and processors to enable communication via the interface route.

An example system to mediate messages in a product integration platform includes a message acquirer. The example message acquirer receives a message request from a source healthcare system where the message request contains a message payload. The example message acquirer determines an interface to be used to route the message to a target healthcare system. The example system includes a message normalizer to create a platform message based on the message request and to adapt the platform message into a message format expected by the interface. The example system includes a message router to route the platform message to the interface.

Another example system to mediate messages in a product integration platform includes a message normalizer. The example message normalizer receives a request message from an integration platform where the request message being received is in a canonical data format. The example message normalizer denormalizes the request message into an interface request message format. The interface request message format corresponds to a message format implemented by an interface. The example system includes a message translator to translate the request message from the interface request message format into a target healthcare system format and to send the request message to the target healthcare system. The target healthcare system format corresponds to a message format implemented by a target healthcare system and the interface is associated with the target healthcare system.

An example system to provision an interface for mediation of messages in a product integration platform includes an integration platform. The example integration platform identifies a target healthcare system, wherein the target healthcare system is a destination for message routing, and identifies configuration rules and protocol requirements for the target healthcare system. The example system includes an interface to define a configuration for the interface associated with the target healthcare system and to construct the target healthcare system interface route. The example interface creates an interface factory to return implementations of an interface route and configuration and passes the interface factory content to an interface control channel. The example interface loads concrete implementations of the interface route and configuration, initializes the interface route, and instantiates interface endpoints and processors to enable communication via the interface route.

An example tangible computer-readable storage medium comprises instructions that, when executed, cause a computing device to receive a message request from a source healthcare system where the message request contains a message payload. The example instructions cause the computing device to determine an interface to be used to route the message to a target healthcare system. The example instructions cause the computing device to create a platform message based on the message request. The example instructions cause the computing device to adapt the platform message into a message format expected by the interface and to route the platform message to the interface.

An example tangible computer-readable storage medium comprises instructions that, when executed, cause a computing device to receive a request message from an integration platform where the request message being received is in a canonical data format. The example instructions cause the computing device to denormalize the request message into an interface request message format. The interface request message format corresponds to a message format implemented by an interface. The example instructions cause the computing device to translate the request message from the interface request message format into a target healthcare system format and to send the request message to the target healthcare system. The target healthcare system format corresponds to a message format implemented by a target healthcare system and the interface is associated with the target healthcare system.

An example tangible computer-readable storage medium comprises instructions that, when executed, cause a computing device to identify a target healthcare system, wherein the target healthcare system is a destination for message routing. The example instructions cause the computing device to identify configuration rules and protocol requirements for the target healthcare system and to define a configuration for the interface associated with the target healthcare system. The example instructions cause the computing device to construct the target healthcare system interface route and to create an interface factory to return implementations of an interface route and configuration. The example instructions cause the computing device to pass the interface factory content to an interface control channel and to load concrete implementations of the interface route and configuration. The example instructions cause the computing device to initialize the interface route and instantiate interface endpoints and processors to enable communication via the interface route.

Figure 1:
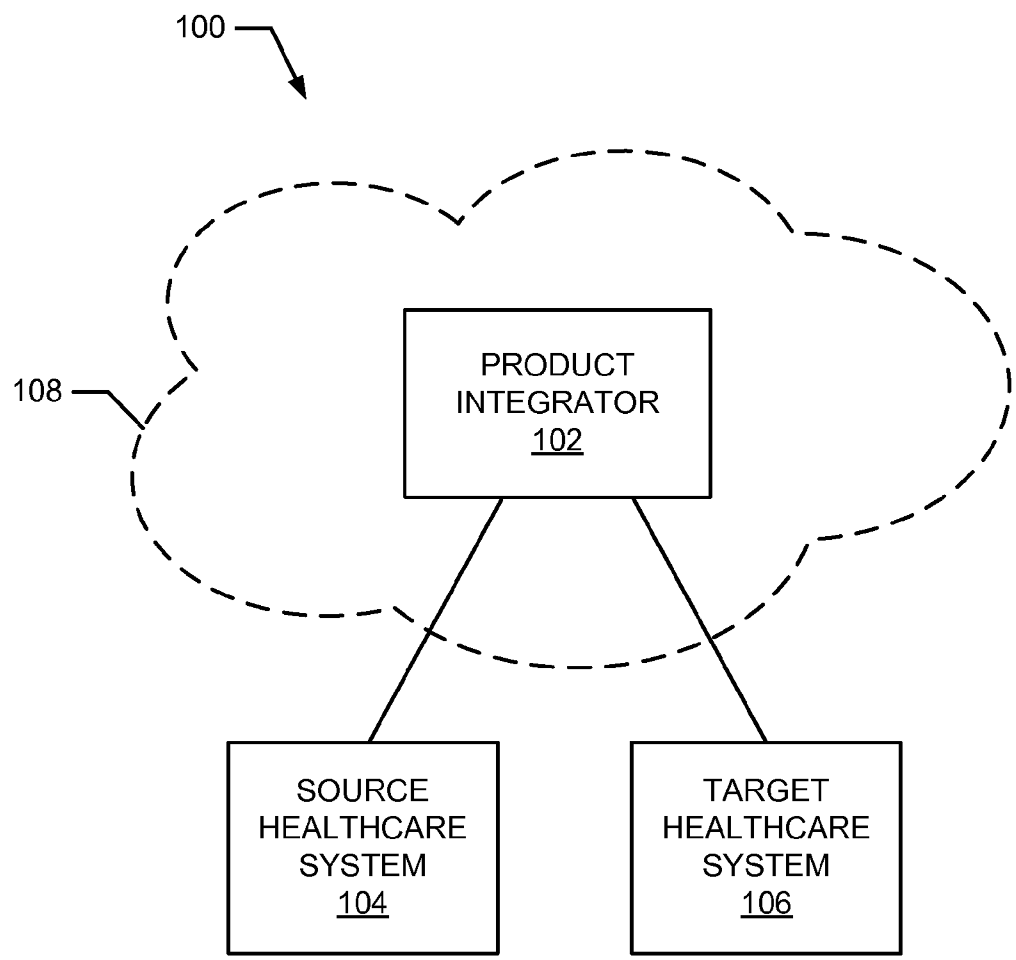
FIG. 1 illustrates a block diagram of an example product integrator in an example healthcare system.

The foregoing summary, as well as the following detailed description of certain examples of the present invention, will be better understood when read in conjunction with the appended drawings. For the purpose of illustrating the invention, certain examples are shown in the drawings. It should be understood, however, that the present invention is not limited to the arrangements and instrumentality shown in the attached drawings.

DETAILED DESCRIPTION OF CERTAIN EXAMPLES

Although the following discloses example methods, systems, and tangible computer-readable media including, among other components, software executed on hardware, it should be noted that such methods and apparatus are merely illustrative and should not be considered as limiting. For example, it is contemplated that any or all of these hardware and software components could be embodied exclusively in hardware, exclusively in software, exclusively in firmware, or in any combination of hardware, software, and/or firmware. Accordingly, while the following describes example methods, systems, and tangible computer-readable media, the examples provided are not the only way to implement such methods, systems, and tangible computer-readable media.

When any of the appended claims are read to cover a purely software and/or firmware implementation, in an embodiment, at least one of the elements is hereby expressly defined to include a tangible medium. As used herein, the term tangible computer readable medium is expressly defined to include any type of computer readable storage and to exclude propagating signals. Additionally or alternatively, the example methods, systems, and tangible computer-readable media may be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

In a healthcare environment, a variety of healthcare information products and/or systems are used to provide medical services, collect medical data, conduct medical exams, etc. Such products and/or systems include, for example, Centricity® Enterprise, Centricity® Electronic Medical Record, Centricity® Business, Centricity® Perinatal, Centricity® Perioperative Anesthesia, Centricity® Advance, etc. offered by GE Healthcare®. Often, these healthcare information systems will be required to communicate to provide higher quality healthcare services with increased efficiency. However, many healthcare information systems operate using various message exchange standards (e.g., Health Level Seven International (HL7 v2.x/v3), Clinical Document Architecture/Continuity of Care Document (CDA/CCD), American Society for Testing and Materials (ASTM), Digital Imaging and Communications in Medicine (DICOM), etc.) and various standards and/or protocols (e.g., Cross-Enterprise Document Sharing (XDS.a/b), Cross-Enterprise Document Media Interchange (XDM), Cross-Enterprise Document Reliable Interchange (XDR), Patient Identifier Cross-Referencing/Patient Demographics Query (PIX/PDQ), Patient Administration Management (PAM), Query for Existing Data (QED), National Council for Prescription Drug Programs (NCPDP), etc.) that make system integration and/or communication more difficult. Some products, for example, Open eHealth Integration Framework (IPF), provide advanced tooling, simplified development data models, and componentized implementations of various health exchange standards and protocols. However, IPF for example, requires that each healthcare product and/or system embed an IPF integration solution within itself to be shared across various products and/or systems. Such product-embeddable shared solutions require versioning and maintenance that decrease the utility of such solutions.

Therefore, it is desirable to create a product integration strategy that would operate consistently across many healthcare information products and/or systems. In some examples, a product integration strategy is built on top of a platform that supports inter-connectivity between various healthcare information products and/or systems. In some examples, the product integration strategy enables new products and/or systems to deploy on the platform to allow new products to interoperate with existing inter-connected products and/or systems. In such examples, new products and/or system may be added by the product integration strategy in a seamless "plug-and-play" manner to reduce the time and effort involved in creating customized integration solutions.

In some examples, the platform provides intelligent mediation and routing between healthcare systems by provisioning communication channels for message and/or data exchange. A healthcare system may send a contract based message to the platform and the platform intelligently identifies an interface for a target healthcare system (e.g., the destination of the message). The platform creates an internal canonical data message to be routed to the interface. The interface translates the internal canonical message to the target healthcare system format. The target healthcare system may send a response to the interface and the response is translated and routed back to the source healthcare system through the platform. The platform performs various transformations on the internal canonical message to facilitate efficient, intelligent, and predictive content-based routing between the various healthcare systems.

Generally, the platform will derive its intelligence from configuration information contained within each interface. Configuration information includes contractual input and/or output format types, rules for message enrichment such as callback services, query and/or search criteria for callback actions, business level rules to govern message routing, message filtering criteria, etc. Interface configuration may be implemented using, for example, Extensible Markup Language (XML) syntax and/or custom expressions based syntax unique to each interface.

FIG. 1 illustrates a block diagram of an example healthcare system 100 capable of implementing a product integrator 102. The product integrator 102 of the illustrated example provides a product integration strategy and/or platform to enable healthcare information products and/or systems (e.g., a source healthcare system 104 and a target healthcare system 106) to interoperate. The product integrator 102 of the illustrated example operates in a cloud 108 (e.g., the product integrator 102 is a cloud-deployable solution) to provide connectivity between the source healthcare system 104 and the target healthcare system 106. The cloud 108 may be, for example, a Java™ Enterprise Edition (JEE) Web application in Microsoft Azure® PaaS (platform as a service). Using the product integrator 102, the source healthcare system 104 and the target healthcare system 106 of the illustrated example exchange healthcare relevant clinical information and/or non-clinical information. For example, the source healthcare system 104 sends information to the target healthcare system 106 and the target healthcare system 106 returns a meaningful response (e.g., not a fault response message) which the source healthcare system 104 embeds into a business processing logic and/or workflow.

In the example of FIG. 1, two healthcare systems are shown: the source healthcare system 104 and the target healthcare system 106. However, any number of healthcare information products and/or systems may operate in the system 100 and exchange information using the product integrator 102. For ease of description in the illustrated example, the healthcare system 104 is referred to as the source system (e.g., the source of the information being sent) and the healthcare system 106 is referred to as the target system (e.g., the destination of the information sent from the source). However, both healthcare systems 104 and 106 may operate to send and/or receive messages using the product integrator 102.

The source healthcare system 104 of the illustrated example is used to construct and publish message(s) and/or message request(s) to the product integrator 102. The source healthcare system 104 may include a channel adapter and/or a service layer to execute the construction and/or publishing of message(s). Messages are created and/or published using contractually defined request and/or response types that may be, for example, represented by XSD complex schema types. The source healthcare system 104 may communicate using a variety of protocols, for example, HL7, Simple Object Access Protocol (SOAP), XML, Hypertext Transfer Protocol (HTTP), Representational State Transfer (REST), Common Object Request Broker Architecture (CORBA), etc. The source healthcare system 104 may utilize a variety of transports, for example, Transmission Control Protocol (TCP), Multipurpose Infrastructure for Network Applications (MINA), HTTP, Java™ Message Service (JMS), Java™ Business Integration (JBI), etc.

The product integrator 102 of the illustrated example acquires message(s) published and/or sent from the source healthcare system 104. The product integrator 102 normalizes (e.g., transforms and/or translates) messages received from the source healthcare system 104 into a canonical data model with associated metadata. The canonical data model provides a standard format for messages. The product integrator 102 may also enrich the canonized messages with content from, for example, external data sources. The product integrator 102 translates the canonized messages into a target message format and mediates the translated messages to the target healthcare system 106.

The target healthcare system 106 of the illustrated example receives messages from the product integrator 102 and generates response messages. The target healthcare system 106 passes the response messages back to the product integrator 102 to be mediated to the source healthcare system 104. The target healthcare system 106 may be represented by, for example, a Document Registry and Repository (DRR) and may implement interactions such as "Provide and Register Document Set" (Integrating the Healthcare Enterprise (IHE) Transaction ITI-41), "Registry Stored Query" (IHE Transaction ITI-18), and "Retrieve Document Set" (IHE Transaction ITI-43). Open eHealth Integration Framework (IPF) provides components, such as "xds-iti41," "xds-iti18," and "xds-iti43," that wrap the IHE transaction endpoints of the DRR and provides a consistent way of rendering the appropriate profile -XDS.b in raw ebXML for consumption by the DRR system's endpoint. The target healthcare system 106 (e.g., the DRR) performs appropriate IHE transactions and sends a response to the product integrator 102.

Figure 2:
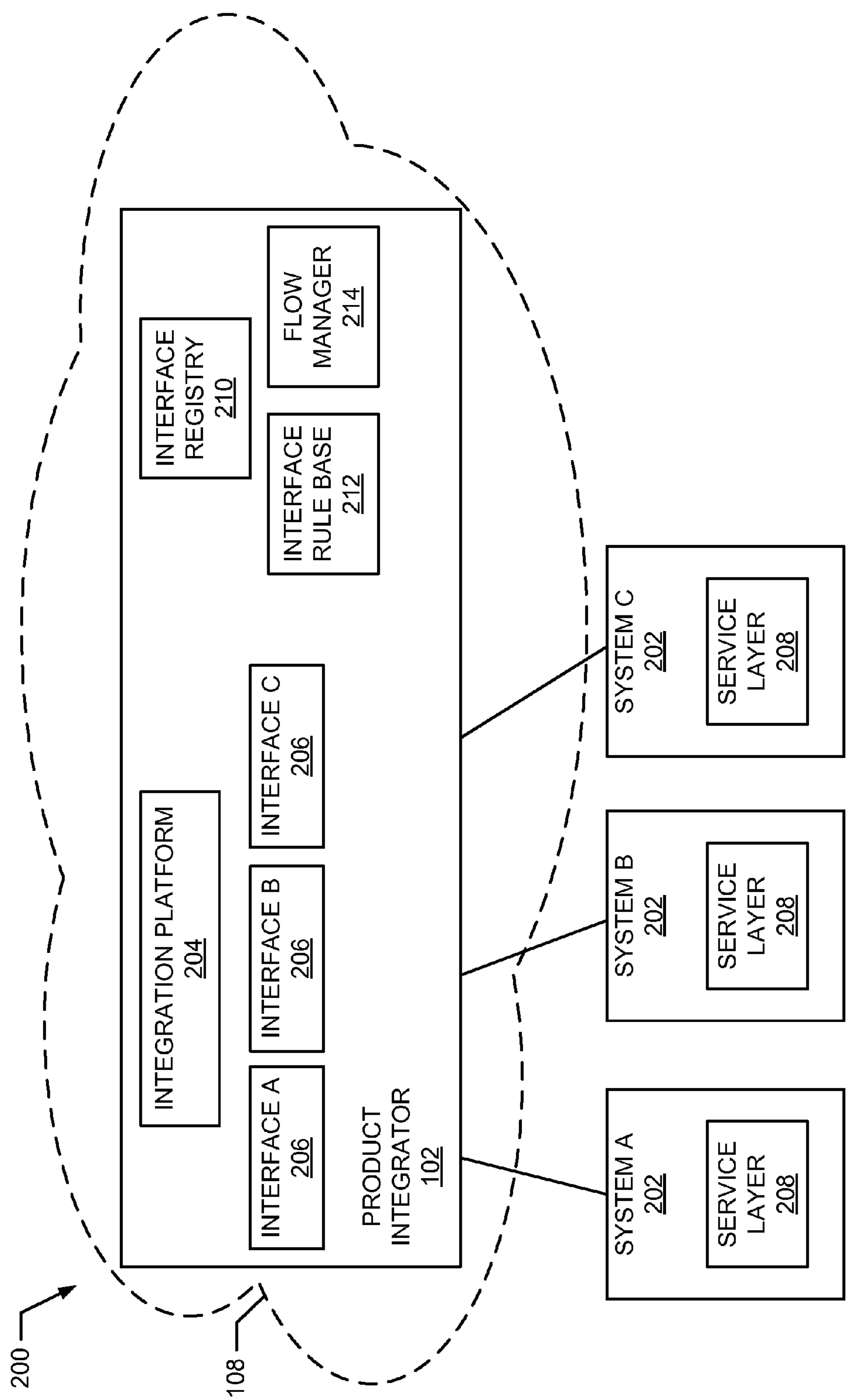
FIG. 2 illustrates a block diagram of an example product integrator in an example healthcare system.

FIG. 2 illustrates a more detailed block diagram of an example healthcare system 200 capable of implementing the product integrator 102. As described above with reference to FIG. 1, the product integrator 102 provides a product integration strategy and/or platform to enable healthcare information products and/or systems (e.g., healthcare systems A, B, and C 202) to interoperate. The healthcare systems A, B, and C 202 are different healthcare systems and/or products, but are described with like reference numbers herein as each system 202 operates in a similar manner. As in FIG. 1, the product integrator 102 of the illustrated example operates in the cloud 108 to provide connectivity between the healthcare systems 202. The cloud 108 may be, for example, a JEE Web application in Microsoft Azure® PaaS. The cloud 108 provides software runtimes and infrastructure components such as relational and/or non-relational databases. Using the product integrator 102, the healthcare systems 202 of the illustrated example exchange healthcare relevant clinical information and/or non-clinical information.

In general, an integration platform 204 is logically abstracted into three tiers: message acquisition, message normalization and/or enrichment, and message mediation and/or routing. Interfaces 206 are pluggable interface components that complement the integration platform 204 as each interface 206 is a logical unit that encapsulates a messaging workflow of each associated healthcare system 202 that is to connect to the product integrator 202. The interfaces 206 are logically and physically distinguished from the integration platform 204 that performs platform functions such as authentication, secured data acquisition, interfaces discovery, message canonicalization, message content enrichment, message filtering, message mediation, content-based routing, error management, and/or message replay. The interfaces 206 are each associated with one healthcare system 202 that is connected to the product integrator 102 and each interface 206 is tailored to suit the message processing and/or protocol translation specific for the associated healthcare system 202.

The product integrator 102 may be built upon the Apache Camel® open-source integration framework and routing/mediation engine. Camel's routing engine defines routes as message processing pipelines encapsulating message flows and intermediary processing between endpoints. Routes are developed and configured with combinations of Enterprise Integration Patterns (EIPs) to implement mediation and routing rules with Java™ based DSL and wired within Spring dependency injection application context files. Processors are used to transform and manipulate messages during routing and to implement EIP patterns. In general, Camel routes comprise endpoints, processors, and beans wired together to work in a cohesive manner driving an integration workflow.

To enable message exchange on the product integrator 102 bus, a service layer 208 of the healthcare system 202 implements a channel adapter to construct and publish messages for consumption by an interface endpoint service fronted by the integration platform 204. This service adheres to contractually defined request and/or response types which are typically represented by XSD complex schema types. The integration platform 204 implements a variety of protocols such as HL7, SOAP, XML/HTTP, REST, and/or CORBA utilizes a variety of transports such as TCP, MNA, HTTP, JMS, and/or JBI. The platform message acquisition channel and/or gateway is modeled closely along the lines of the message channel enterprise integration pattern where essentially a source application (e.g., the healthcare systems 202) sends command messages to the channel that acts as a façade to the integration platform 204. The message is normalized into a canonical data model with associated metadata, enriched with content from external data sources, and mediated across the logical tiers of the integration platform 204 to be routed to an interface 206 message channel. The platform 204 message acquisition channel is a coarse-grained service that performs secured message acquisition from client sources (e.g., the healthcare systems 202) and passes messages to further distributed processing eventually routing the messages, which have been canonized into a standard format, to the interface 206 channel. The interface 206 message channel service is fine-grained and intelligently structured to suit the logical and/or message protocols of its associated healthcare system 202 that is the final destination for the messages. The product integrator 102 enables a common, shared governance model representative of the interconnected product landscape to provide for consistent system initialization and interface provisioning.

Each interface 206 is deployed (e.g., loaded) with three general logical components: an interface route, an interface configuration, and an interface factory. A message endpoint is defined within the interface route which is tailored specifically for the workflow needs of the interface 206 encapsulating the message processing and/or protocol translation necessary for invocation of the associated target healthcare system 202. The interface configuration consists of pre-defined message contracts. The message contracts define what the interface 206 expects to receive in terms of message content and the message it expects to send back in response after invocation of the associated target healthcare system 202. The interface factory is a logical component of the interface 206 that contains and/or returns concrete instances of the interface route and interface configuration.

In some examples, the interface configuration is loaded from an interface properties file structured in XML that consists of, among other elements, a message handler implemented as a parameterized class that defines request and/or response message object types. The interfaces 206 are designed as self-contained units to be pluggable onto the integration platform 204. Thus, the configuration of each interface 206 contains, in addition to defined message contracts, any information that is required to support the message processing and/or protocol translation specific for the associated target healthcare system 202 to which the interface 206 is a façade. The information could include, for example, the target healthcare system 206 endpoint uniform resource locator (URL), a listing of callback services that are required to enrich an original message sent to the product integrator 102, a query or search criteria for a callback, a callback service URL, message filtering criteria, and/or other business rule definitions specific for the target healthcare system 202 that are applied to messages. In some examples, configuration information is defined within an XML file and loaded at the start of the system 200.

In addition to the message acquisition channel, the integration platform 204 provides an additional interfaces control channel. A platform manager component listens on this channel for interfaces 206 to be provisioned. At provisioning time, each interface 206 sends a special message to the integration platform 204 on this control channel, announcing its presence, which is published to an interfaces registry 210. In some examples, each interface 206 sends the interface factory resource classpath to be published to the interfaces registry 210. The interfaces registry 210 may be stored within Azure® Blob storage services to be shared across servers during deployment. During startup of the system 200, the interfaces registry 210 is read by the platform manager and the concrete instances of the interface route and interface configuration classes are loaded from the interface factory. The interface configuration is loaded and the interface route is booted up and the endpoints are instantiated. Business level rules applicable to the interface 206 implementation that govern the routing of messages are populated into an interface rule base 212 that may be implemented using Structured Query Language (SQL) Azure®. At startup of the system 200, in addition to reading configuration settings that control behavior of the interfaces 206 and booting the interface routes, the platform manager also boots all the intermediate platform Camel routes involved in message processing and/or routing.

The message acquisition channel of the integration platform 204 may be provisioned either via a secured Web Site (WS-*) endpoint (e.g., using Camel's "cxf:" component) or a RESTful endpoint (e.g., using Camel's "cxfrs:" component) with a configured endpoint interface and/or message contract declaratively configured within a Camel route wired with other intermediary endpoints and processors. In some examples, the message acquisition channel could also be available via a TCP (e.g., MINA) endpoint that could be configured to receive HL7 v2.x messages. A collection list of request messages, which may include appropriate security credentials, are sent to the message channel of the integration platform 204. Each request message consists of a handle string and a wrapped message string encapsulating the message payload content in XML format. The platform message acquisition channel may receive a collection list of multiple request messages where each request message is routed to a different interface 206 endpoint (e.g., each message in the list is sent to a different healthcare system 202). In some examples, the collection of request messages are routed to the same interface 206 endpoint but contain varying message payloads representing different patient data. The request message object may be Java™ Architecture for XML Binding (JAXB) annotated to ensure that the channel's underlying JAX-WS (Java™ API for XML Web Services) or JAX-RS (Java™ API for RESTful Web Services) protocol and logical interceptors successfully unmarshall the Web service request that is sent across. In case of a TCP request that encapsulates an HL7 v2.x message, a custom unmarshaller may be used to parse the HL7 message's observation segment (OBX) to obtain an individual request message. In such examples, several OBX segments on the HL7 message would emulate the collection list of multiple request messages.

A processor in the platform message acquisition channel route of the integration platform 204 uses the handle string passed within the body of the request message to look up an appropriate message handler that is configured within a mapping resource. In some examples, this handler is configured within an XML configuration file that maps the handle contained in the request message originally passed in and the JAXB context-path of the message handler implementation. The handler, in some examples, implemented as a parameterized class deployed in the interface 206 classloader space, provides the plumbing for defining the expected request message payload and response message payload types. The expected request message payload object, as enforced by the message handler, may be JAXB annotated containing several optional elements representing message types that could further enrich the original message payload passed in. This enriching of the original payload content happens via a callback mechanism to the source system's service layer 208 or multiple other partner systems (e.g., other healthcare systems 202). Processing infrastructure exists that performs the unmarshalling of the request message payload and marshalling of the response message payload using the appropriate message handler for the interface 206. Marshalling and/or unmarshalling generally refers to the conversion of a data object to a data format suitable for storage and/or transmission. Such marshalling and/or unmarshalling may perform such conversions according to an appropriate network transfer protocol. A transformation processor defined on the channel route of the integration platform 204 uses a singleton factory object to load the XML handle-message handler mapping file into a collection map of handler objects which it then queries with the handle string to obtain the appropriate JAXB context-path of the request handler class which is used to unmarshall the message string contained within the body of the request message. In some examples, the message string is unmarshalled into a transient instance of a message object that is encapsulated within the request message.

Once the message string encapsulated within each individual request message has been successfully unmarshalled, the first stage of the message acquisition process is concluded. In the next stage of acquisition, the list of request messages are split into individual request messages. Such splitting may be implemented using the Splitter EIP. In some examples, this splitting is implemented using Camel's split( ) DSL. Each individual request message is routed to a message dispatcher infrastructure to be eventually mediated for interface 206 route invocation. Splitter EIP operates in conjunction with an Aggregator EIP so that that individual responses coming back for each request message sent out will be recombined by an aggregation and/or orchestration strategy. Therefore, essentially, the messages are split, individual request messages are sent to a message dispatcher which routes individual messages to the appropriate interface 206 routes. The Aggregator EIP, implemented within a Camel processor, receives the response messages and, based upon correlation identifications and/or completion conditions, identifies messages that are related. In some examples, a customized implementation of Camel's AggregationStrategy is used to determine how to combine all related messages into a single response message that is then sent back to source healthcare system 202.

The message mediation process commences with a message dispatcher component serving as an initiator of synchronous message processing to the interface 206 route and handling of response messages. The dispatcher queries, along with the message handler obtained for each request message, for the associated interface 206 (e.g., the interface 206 that is interested in receiving the message). In some examples, the dispatcher searches the deployed interface configurations (e.g., configurations that were initially loaded at system 200 start-up by the platform manager) to match the message handler specified by the request message with the one configured on the interface 206. This scan and subsequent association match with a deployed interface 206 is referred to as the "discovery" of the interface.

Once the interface 206 has been found (e.g., discovered) for that request message, a message translator processor normalizes the unmarshalled message payload into a canonical data model, referred to herein as a platform message, that acts as the container for the message payload along with interface 206 associated metadata. The platform message is a container of any data that the interface 206 expects via its pre-defined contract exposed via the message handler infrastructure and contains metadata elements that enable content based routing of the message to subsequent downstream endpoints and processors. The platform message is serializable and a metadata element identifies the associated (e.g., discovered) interface 206 to which the platform message is to be routed. The message translator adds a metadata recipient element that represents the discovered interface 206 to enable the message to be routed based on content by a downstream processor.

In some examples, the message data model supports multiple collections of message payload objects ordered within a map of wrapped Java™ objects. This is important if the platform message is to be enriched via callbacks to various other data sources such as the source healthcare system's service layer 208 and/or multiple "partner" systems. Newly retrieved message payloads would be appended to the initial map. This provides an additional level of abstraction above individual message formats and allows multiple messages to be combined into a single instance of a platform message to be hopped to the interface endpoint. The formats of the message(s) appended in the enriched platform message may not correspond to what the interface channel expects as specified by the interface configuration and enforced by the interface message handler implementation. Therefore, an interface channel adapter may adapt the platform message containing the enriched multiple message payload(s) into the message payload that the interface 206 expects.

The integration platform 204 enforces the requirement that all request message object payloads be translated to the platform message canonical data format. The platform message format is also used when returning response messages. A similar de-normalizer processor is used on the returning platform message to unwrap the response message payload and cast it back into the expected response message type as defined by the message handler for that request message.

A content-based router examines the message content (e.g., the metadata element on the platform message that contains the interface 206 endpoint) and routes the message to the appropriate message processor channel based upon that data. Every interface 206 endpoint in the product integrator 102 essentially gets a dedicated message processor channel. In some examples, the message processor channels are implemented either via Camel's "jms" or "direct" component. In some examples, the content-based router self-configures based on the rules stored in the rule base 212 that were created from the interface configuration that lists conditional preferences for each participating interface 206. When a message arrives, the content-based router evaluates all rules and routes the message to the recipient whose rules are fulfilled and/or routes the message based on message content in the metadata element of the platform message. This allows for efficient, predictive routing for the content-based router to potential interface 206 recipient(s) based on business rules and not solely dependent on message content alone.

It is common for the target healthcare system 202 to request and/or require additional information that the source healthcare system 202 may not provide. For example, the source healthcare system 202 may be an enterprise EMR system and the target healthcare system 202 may be a Document Repository, and the interactions between the two systems 202 may primarily involve discrete healthcare data exchange built around an IHE ecosystem. Such interactions may primarily consist of exchanging CCD (Continuity of Care) documents wrapped within XDS (Cross-Enterprise Document Sharing) profiles with an XDS document registry required for indexing documents in a Health Information Exchange and an XDS Document repository for the actual storage of the clinical documents. The source healthcare system 202 is not expected to pass in the actual CCD document, but rather it passes in a source Patient Identifier which the product integrator 102 utilizes to construct a callback service request into the source healthcare system's service layer 208 that extracts the CCD from a local database repository. The response from the service layer call is then aggregated into the platform message thereby enriching it with additional information. In some examples, the callback service is declaratively configured along with the query/search criteria within the interface 206 configuration and an AbstractFactory JEE pattern is used at a content enricher processor to instantiate and construct these callback service requests. Each callback service request is a stateless, standalone Web service request to the source healthcare system's service layer 208. Several such callback service requests could be constructed with the callback destination not necessarily only tied to the source healthcare system's service layer 208, but rather by wiring together external, distributed partner services that leverage existing enterprise or cross-enterprise assets. In some examples, a stateful process manager implementation (e.g., using Business Process Execution Language (WS-BPEL)) is used to maintain the sequence and orchestrate the execution of multiple cohesive services that are capable of being re-used through composition.

In addition, a message filter may be used to eliminate unwanted messages from the channel. For example, an enterprise EMR system may send physician orders information to a business revenue cycle management system. A certain order type may be deemed unnecessary and likewise declaratively configured within the interface configuration. A processor applies the filtering criteria specified by the interface configuration to the message content and discards the message if it does match.

The routing of the canonical platform message happens as a result of a sequence of hops from the message processor channel to the interface 206 message endpoint. The interface route is tailored specifically for the workflow needs of that interface 206 that encapsulates the message processing and protocol translation necessary for invocation of the target healthcare system 202. The interface message channel gets the platform message adapted from the message object payload that was initially passed in from the source healthcare system 202, enriched along the way by callback(s) into the source system 202 and/or additional external partner services or systems. The interface service is more fine-grained and, since the interface 206 configuration is where the message contracts are defined, the first and foremost task is for the interface 206 to validate via its configuration, the message payload passed within the platform message with what that interface 206 expects. The interface route is intelligently structured to translate the validated message payload into the protocol format that the target healthcare system 202 expects.

In some examples, the interface route is built using components of the Open eHealth Integration Framework (IPF) which provides an extension to Apache Camel®'s mediation/routing engine. IPF provides a programming layer that allows for construction of routes based on the Groovy programming language and comes with comprehensive support for message processing and connecting systems in the eHealth domain. IPF augments Camel by providing domain-specific languages DSLs for Enterprise Integration Pattern (EIP) implementations in healthcare integration scenarios. An example of a healthcare integration scenario includes the implementation of interfaces for transactions specified in IHE profiles such as XDS.a/b, XDM, XDR, PIX, PAM and PDQ or for HL7 v2.x/v3.x message processing. IPF also provides DSL support in regards to constructing, parsing, validating, transforming and/or rendering Clinical Document Architecture (CDA) standard documents to enable electronic processing for clinical document exchange and decision support.

An interface message translator receives the message payload and may receive additional information from the interface configuration file that may be necessary to construct the target healthcare system 202 request, which may be done using an IPF based "Transmogrifier" implementation. The Transmogrifier is an IPF provided interface used to translate one internal data structure to another and is converted into a Camel processor behind the scenes during execution. The Transmogrifier is implemented as a parameterized class in the manner of Transmogrifier<S, T> where S is the source message format and T is the target message format. In some examples, the target healthcare system 202 request format is defined by an IPF abstracted model for ebXML representation of IHE transactions (such as ITI-18, ITI-41, ITI-43 etc.) and requires information from the CDA document that is passed along with the request message payload. The parsing, validating and/or extracting information from the CDA document in the midst of constructing the target system request is done within the Transmogrifier.

Once the request is created, it is sent to a target healthcare system 202 endpoint fronted by the interface 206. In some examples, the target healthcare system 202 is represented by a Document Registry and Repository (DRR) with the interactions happening around "Provide and Register Document Set" (IHE Transaction ITI-41), "Registry Stored Query" (IHE Transaction ITI-18) and "Retrieve Document Set" (IHE Transaction ITI-43). IPF provides components (such as "xds-iti41", "xds-iti18" and "xds-iti43") that wrapper the forementioned IHE transaction endpoints of the DRR and provides a consistent way of rendering the appropriate profile (e.g., XDS.b in raw ebXML for consumption by the DRR system's endpoint). The target healthcare system 202 represented by the DRR in this example performs the appropriate IHE transaction and sends back the response to the interface route. The response from the interface route, containing either an interface service reply or a fault, is then translated into the message response that the interface message handler contract specifies. The message is re-normalized and piggy-backed upon a platform message instance to the calling processor (e.g., a message dispatcher). The message dispatcher that is the initiator of the synchronous message invocation uses the message handler instance passed onto it to unwrap the platform message and cast the response back to the expected response type. The response messages are then aggregated and marshalled for response back to the source healthcare system 202.

In some examples, an amalgamated interface could be created that represents a fusion between the functionality of several individual interfaces 206. Since each interface 206 is defined with a contract that provides for loose-coupling between individual invocations, an amalgamated interface contract is created by combining the contract of several individual interfaces 206. The amalgamated interface is deployed as a standard interface with the requisite interface route representing the fused interface workflow, an interface configuration consisting of a message handler that defines the new fused contract and an interface factory. For example, the source healthcare system 202 triggers request messages to be sent to the amalgamated interface routed via the integration platform 204. The interface endpoint gets the platform message containing the fused message payload that it expects. Portions of the message payload are extracted within a processor in the interface route and utilized to construct a series of request messages that could sequentially, and/or via a multicast, be routed to other interfaces. The routing of the request message happens via the integration platform 204, but the message acquisition channel of the integration platform 204 may be bypassed, and the message may go directly to the message dispatcher component. Response(s) from the individual interfaces are then re-combined into the amalgamated interface response and send back to the source healthcare system 202. In some examples, the response from an interface may be utilized to construct a new request message that is then sent to another interface. A typical example involves utilizing the result of a PIX v3 Query interface encapsulating a "Patient Identifier Cross-Reference—Query" workflow (embodied within IHE Transaction ITI-45), in creating the request for an XDS "Provide and Register Document Set" interface (embodied within IHE Transaction ITI-41).

For better administration and trouble-shooting of inbound and outbound messages that are routed within the product integrator 102, a platform manager along the lines of a control bus EIP may be used for management of components involved in the message flow. The platform manager is a visualization and trouble-shooting dashboard that allows for viewing all messages that have passed through the integration platform 204, including the messages that failed to be passed to the interface. Additional views may display an individual message in its original and its translated format, as well as allow the message to be edited, modified and/or resubmitted for processing. In some examples, the platform manager leverages a flow manager 214 functionality provided by the Open eHealth Integration Framework (IPF). The flow manager 214 may use hibernate to store each incoming message as a flow object in a database via IPF-provided flow management DSL extensions added to Camel routes and/or updates the flow object as the message travels through the integration platform 204. The flow manager 214 allows for storing flow data and messages in, for example, a Derby and/or Oracle database. Migration from the Oracle DB to SQL Azure® may be made possible using the SQL Server Migration Assistant for Oracle along with the SQL Azure® Migration Wizard. In some examples, the flow manager 214 stores string representations of messages that pass through the integration platform 204. These string representations can be visualized either via a generic Java™ Management Extension (JMX) client (e.g., JConsole from Java™ SDK 6) or via the platform manager 214 built on Eclipse Rich Client Platform (RCP) technology that provides a flow management user interface and general purpose JMX client.

Figure 3:
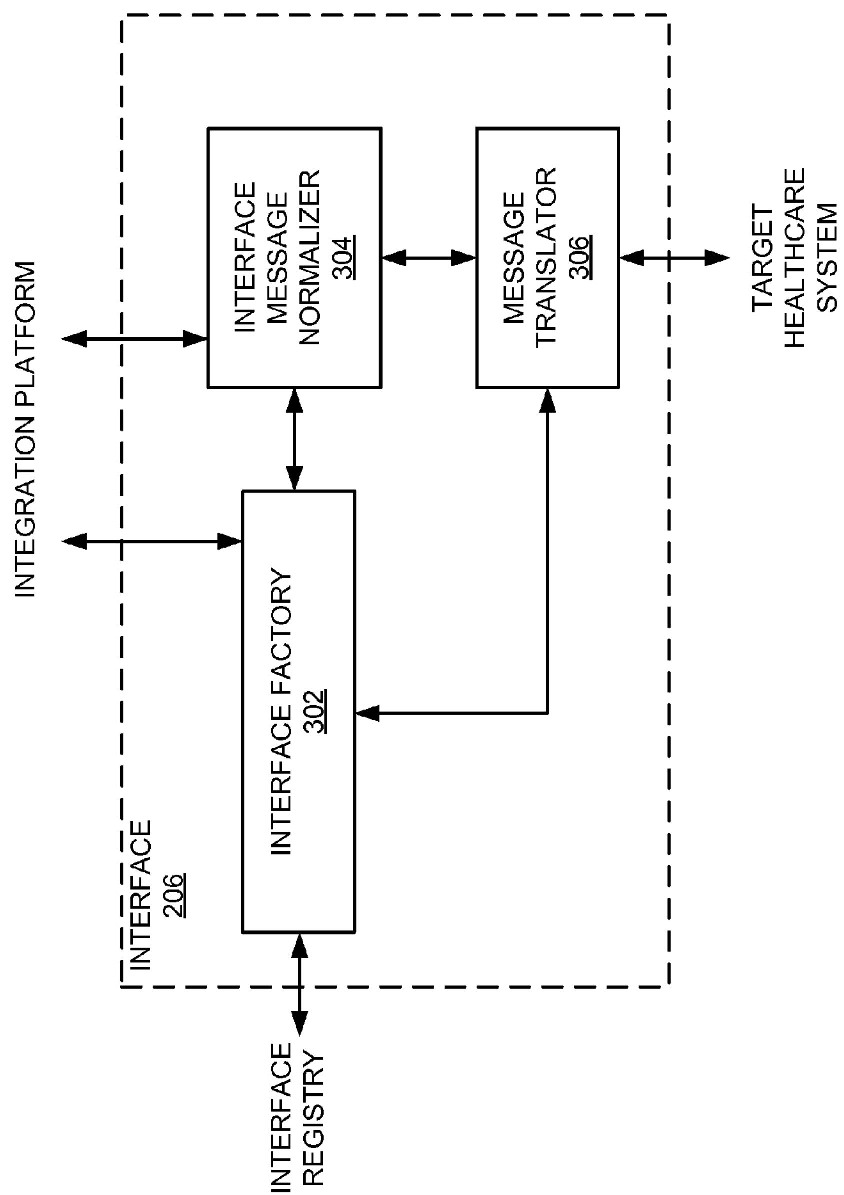
FIG. 3 illustrates a block diagram of an example interface of FIG. 2.

FIG. 3 illustrates an example interface 206 to be used by the example product integrator 102 of FIG. 2. Interfaces (e.g., the interface 206) are deployed and/or configured for each healthcare information system to be connected to the product integrator 102. To perform configuration and/or provisioning, the interface 206 is deployed with an interface factory 302.

When an interface is deployed, a message endpoint is defined within an interface route provided by the interface factory 302 which is tailored specifically for the workflow needs of the interface (e.g., interface 206) encapsulating the message processing and protocol translation necessary to establish communication with a healthcare system (e.g., the target healthcare system 106 of FIG. 1). When an interface is deployed, an interface configuration provided by the interface factory 302 is loaded that defines message contracts. Message contracts define message content that the interface 206 expects to receive and define message content that the interface 206 expects to send back in responses from the target healthcare system 106 to the source healthcare system 104. An interface configuration may be loaded from an interface properties file structured in XML that consists of a message handler implemented as a parameterized class that defines message contracts (e.g., request and/or response message object types). The interface configuration file also contains other information required to support message processing and protocol translation specific for the target healthcare system 106, such as an endpoint URL of the target healthcare system 106, a listing of callback services that are required to enrich an original message sent from the source healthcare system 104, a search criteria for a callback service, a callback service URL, message filtering criteria, and/or other business rule definitions specific for the target healthcare system 106 to be applied to any incoming messages. In some examples, configuration information is defined within an XML file and loaded at the start up of the system 200 of FIG. 2.

When the interface 206 is to be provisioned, the interface 206 sends a message to the interfaces registry 206 of FIG. 2 for publishing. In some examples, the interface 206 sends the interface factory 302 resource classpath to the interfaces registry 206 for publishing. When the product integrator 102 is started up, the interface registry 206 is read by the integration platform 204 and concrete instances of the interface route and interface configuration classes are loaded into a platform manager of the integration platform 204 from the interface factory 302. The interface configuration is loaded and the interface route is booted up and the endpoints are instantiated. Business level rules applicable to the interface 206 that govern the routing of messages to the interface 206 are stored in a rule database of the integration platform 204. During the start up of the integration platform 204, the platform manager of the integration platform 204 also boots any intermediate platform Camel routes involved in message processing and routing.

Once the interface 206 has been deployed and/or configured, the interface 206 processes messages sent from the source healthcare system 104 via the integration platform 204 to the target healthcare system 106. To perform such message routing, the interface 206 of the illustrated example includes an interface message normalizer 304 and a message translator 306. The integration platform 204 converts messages received from the target healthcare system 106 to platform messages. Platform message are adapted from the message object payload that was initially passed from the source healthcare system 104 and are described in greater detail below in connection with FIG. 4. The interface message normalizer 304 of the illustrated example receives platform messages from the integration platform 204. The interface message normalizer 304 denormalizes (e.g., transforms and/or translates) the platform messages (e.g., from a canonical data format) to obtain the message payloads passed within the platform messages. The interface message normalizer 304 uses the interface configuration rules contained in the interface factory 302 to determine that the message payloads passed within the platform messages are consistent with the types of messages the interface 206 expects to receive. Once the interface message normalizer 304 validates the message payloads, the message payloads are sent to the message translator 306.

The message translator 306 of the illustrated example translates the validated message payloads into a protocol format expected by the target healthcare system 106. The message translator 306 may also receive any additional information contained in the interface configuration file from the interface factory 302 that may be useful in translating the message payloads. The translation may be performed by the message translator 306 using an IPF based Transmogrifier implementation. A Transmogrifier is an IPF provided interface used to translate an internal data structure to another internal data structure and is converted into a Camel processor during execution. The Transmogrifier is implemented as a parameterized class in the manner of Transmogrifier<S, T> where S is the source message format and T is the target message format. In some examples, the target system request format is defined by an IPF abstracted model for ebXML representation of IHE transactions (e.g., ITI-18, ITI-41, ITI-43, etc.) and requires information from the additional information from the interface configuration file (e.g., a CDA document) that is passed along with the message payload. The message translator 306 of the illustrated example may parse, validate, and/or extract information from the additional information during translation of the message payload to the target message format.

Once the message translator 206 has translated the message payload to the target message format, the message translator 206 sends the message to the target healthcare system 106. The target healthcare system 106 sends a response message (e.g., a reply or a fault message) to the message translator 306 of the interface 206. The message translator 306 of the illustrated example translates the response message into a format defined by the interface message handler contract and sends the translated response message to the interface message normalizer 304. The interface message normalizer 304 renormalizes the response message into a platform response message. The interface message normalizer 304 sends the platform response message to the integration platform 204 to be processed to the source healthcare system 104.

Figure 4:
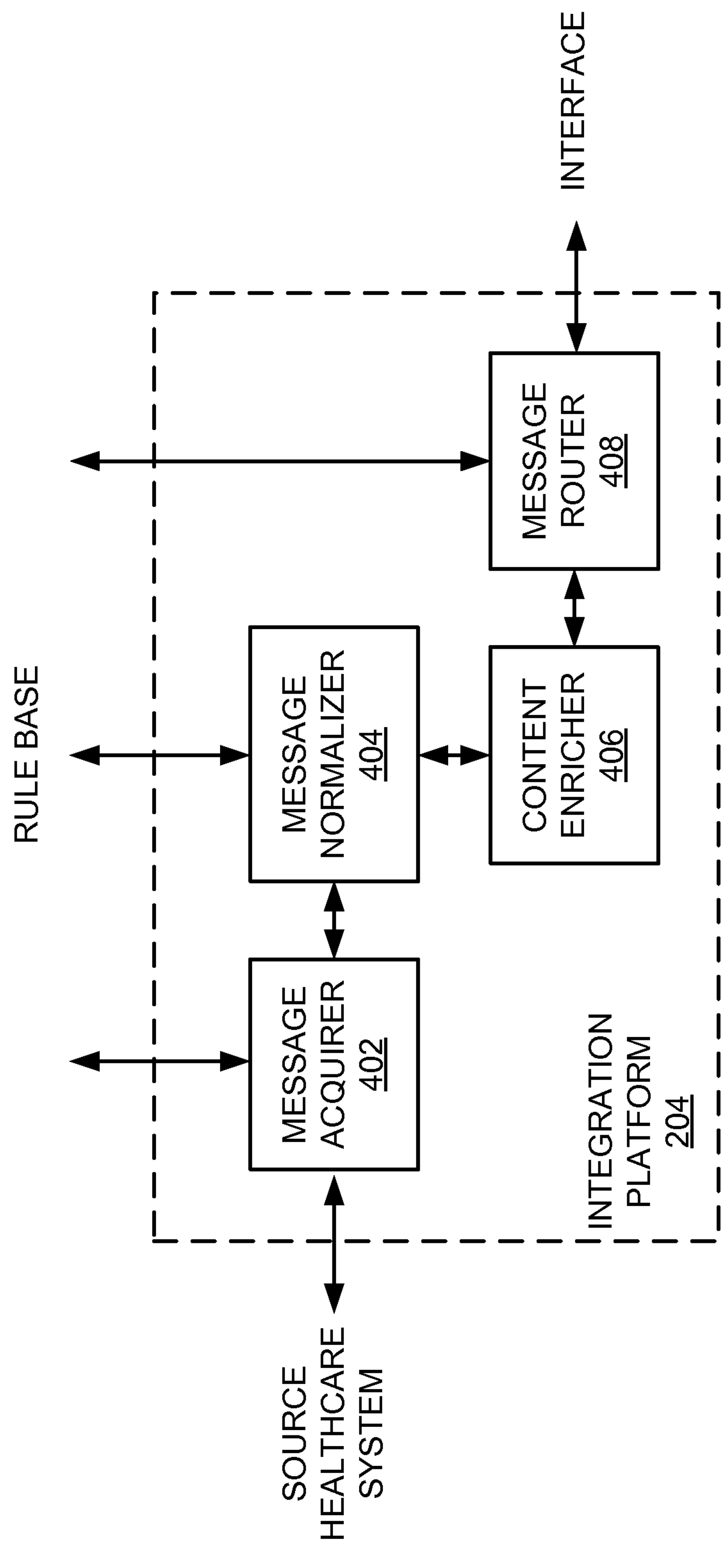
FIG. 4 illustrates a block diagram of an example integration platform of FIG. 2.

FIG. 4 illustrates an example integration platform 204 of the example product integrator 102 of FIG. 2. The integration platform 204 is used to acquire, normalize, enrich, and mediate messages received from a healthcare information system (e.g., the source healthcare system 104 of FIG. 1). The integration platform 204 includes a message acquirer 402, a message normalizer 404, a content enricher 406, and a message router 408.

The message acquirer 402 of the illustrated example receives messages from the source healthcare information system 104. The source healthcare system 104 sends, for example, message strings encapsulated within each individual request message. The message acquirer 402 may be provisioned via a secured WS-* endpoint (e.g., using Camel's "cxf:" component) and/or a RESTful endpoint (using Camel's "cxfrs:" component) with a configured endpoint interface (and message contract) declaratively configured within a Camel route wired with other intermediary endpoints and processors. In some examples, the message acquirer 402 is also available via a TCP endpoint that could be configured to receive HL7 v2.x messages.

The message acquirer 402 of the illustrated example receives a request message and/or a collection list of request messages. If the message acquirer 402 receives a collection list of multiple request messages, the message acquirer 402 may route each request message to one or more target healthcare information systems (e.g., the target healthcare system 106). In some examples, the message acquirer 402 routes the collection of request messages to one healthcare information system, but each request message contains various message payloads that may, for example, represent different patient data. In some examples, the request messages include security credentials which may be verified by the message acquirer 402.

Because the source healthcare system 104 sends message strings encapsulated within each individual request message, the request messages are unmarshalled (e.g., a copy of the original message object is obtained). The request message object may be, for example, JAXB annotated to ensure that the underlying JAX-WS and/or JAX-RS protocol and logical interceptors of the message acquirer 402 successfully unmarshall the Web service request that is sent to the message acquirer 402. If, for example, a TCP request encapsulates an HL7 v2.x message, a custom unmarshaller would parse the HL7 message's OBX segment to obtain an individual request message. Several OBX segments on the HL7 message would emulate the collection list of multiple request messages.

Each request message acquired by the message acquirer 402 consists of a handle string and a wrapped message string encapsulating the message payload content in, for example, XML format. The message acquirer 402 uses the handle string within the body of the request message to determine an appropriate message handler that is configured within a mapping resource. In some examples, this message handler is configured within an XML configuration file that maps the handle contained in the request message originally passed in and the JAXB context-path of the message handler implementation. The message handler provides the specifications for defining the expected request message payload and response message payload types. The message handler information may be stored in, for example, the rule base 212 of FIG. 2. The expected request message payload object, as enforced by the message handler, is JAXB annotated containing several optional elements representing message types that could further enrich the original message payload passed in. This enriching of the original payload content happens via a callback mechanism to the healthcare information system from which the message was received.

The message acquirer 402 unmarshalls the request message payload using the appropriate message handler. The message acquirer 402 loads the XML handle-message handler mapping file (e.g., stored in the rule base 212) into a collection map of handler objects which it queries with the handle string to obtain the appropriate JAXB context-path of the request handler class which is used to unmarshall the message string contained within the body of the request message. In some examples, the message string is unmarshalled into a transient instance of a message object that is encapsulated within the request message.

Once the message string encapsulated within each individual request message has been successfully unmarshalled, the message acquirer 402 of the illustrated example splits the collection of request messages into individual request messages. The message splitting may be implemented, for example, using Camel's split( ) DSL. The message acquirer 402 splits the collection of request messages into individual request messages to be routed to appropriate interfaces and appropriate healthcare information systems.

Once the collection of request messages has been split into individual request messages, the message acquirer 402 determines the appropriate interface that each request message will be routed to. For example, the message acquirer 402 searches the interfaces that have been deployed (e.g., the interfaces that were loaded at start-up) to match the message handler specified by the request message with the message handler configured on the interface. The message acquirer 402 matches the message handlers using information stored in the rule base 212. This scan and association match of a request message with a deployed interface may be referred to as the discovery of the interface.

Once an interface has been associated with a request message, the message normalizer 404 of the illustrated example normalizes the unmarshalled message payload into a canonical data model, referred to herein as a platform message, which acts as a container for the message payload along with metadata associated with the discovered interface. A platform message is a container of any data that the discovered interface expects via its pre-defined contract determined using the message handler infrastructure of the interface. The platform message also contains metadata that enables content based routing of the message to subsequent healthcare information systems. The metadata identifies the discovered interface that each platform message is to be routed to.

The content enricher 406 allows the platform message normalized at the message normalizer 404 to support multiple collections of message payload objects, for example, ordered within a map of wrapped Java™ objects. This allows the platform messages to be enriched via callbacks to various other data sources, such as, for example, the source healthcare system 104 or various other partner systems. Newly retrieved message payload(s) are appended to the initial message payload. Thus, multiple messages may be combined into a single platform message to be sent to the target healthcare system 106. If the appended message payloads are not in the format expected by the discovered interface, the content enricher 406 adapts the platform message with appended message payloads into a message payload that the discovered interface expects.

For example, the source system 104 may not pass an entire document, such as a Continuity of Care document (CCD), to the integration platform 204. Rather, the source system 104 may pass a patient identifier that the content enricher 406 may use to construct a callback service request in a service layer of the source healthcare system 104 that extracts the CCD from a local database repository. The response from the service layer of the source healthcare system 104 may be aggregated into the platform message by the content enricher 406 to enrich the platform message with additional information. The callback service performed by the content enricher 406 is a standalone service request to the source healthcare system 104 (e.g., the service layer of the source healthcare system 104). Several callback service requests may be constructed by the content enricher 406.

The message router 408 examines the content of the message obtained from the content enricher 406 (e.g., the metadata in the platform message that identifies the discovered interface). The message router 408 routes the message to the discovered interface via a message processor channel dedicated to that interface (e.g., the interface 206). For example, each interface is assigned a dedicated message processor channel implemented via Camel's "jms" or "direct" component. In some examples, the message router 408 can self-configure based on rules created during interface configuration and stored in the rule base 212. Such rules may, for example, describe message conditional preferences for each configured interface. In such examples, upon receiving a message, the message router 408 evaluates the rules and routes the message to an interface whose rules are fulfilled (e.g., not violated). In some examples, the message router 408 routes message based on interface rules and based on metadata contained in the message itself.

The message router 408 may also filter the messages to eliminate unwanted messages from the message processor channel. Unwanted messages may be, for example, a message containing a certain medical order type. Such unwanted messages may be defined during configuration of an interface and stored in the rule base 212. The message router 408 may apply the filtering criteria to the message content to discard any unwanted messages.

FIGS. 5-10 illustrate flow diagrams of example methods of implementing the example product integrator 102 of FIGS. 1 and 2, the example interface 206 of FIG. 3, and the example integration platform 204 of FIG. 4. The example process(es)

of FIGS. 5-10 can be performed using a processor, a controller and/or any other suitable processing device. For example, the example process(es) of FIGS. 5-10 can be implemented using coded instructions (e.g., computer readable instructions) stored on a tangible computer readable medium such as a flash memory, a read-only memory (ROM), and/or a random-access memory (RAM). As used herein, the term tangible computer readable medium is expressly defined to include any type of computer readable storage and to exclude propagating signals. Additionally or alternatively, the example process(es) of FIGS. 5-10 can be implemented using coded instructions (e.g., computer readable instructions) stored on a non-transitory computer readable medium such as a flash memory, a read-only memory (ROM), a random-access memory (RAM), a cache, or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals.

Alternatively, some or all of the example process(es) of FIGS. 5-10 can be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example process(es) of FIGS. 5-10 can be implemented manually or as any combination(s) of any of the foregoing techniques, for example, any combination of firmware, software, discrete logic and/or hardware. Further, although the example process(es) of FIGS. 5-10 are described with reference to the flow diagram of FIGS. 5-10, other methods of implementing the process(es) of FIGS. 5-10 can be employed. For example, the order of execution of the blocks can be changed, and/or some of the blocks described can be changed, eliminated, sub-divided, or combined. Additionally, any or all of the example process(es) of FIGS. 5-10 can be performed sequentially and/or in parallel by, for example, separate processing threads, processors, devices, discrete logic, circuits, etc.

Figure 5:
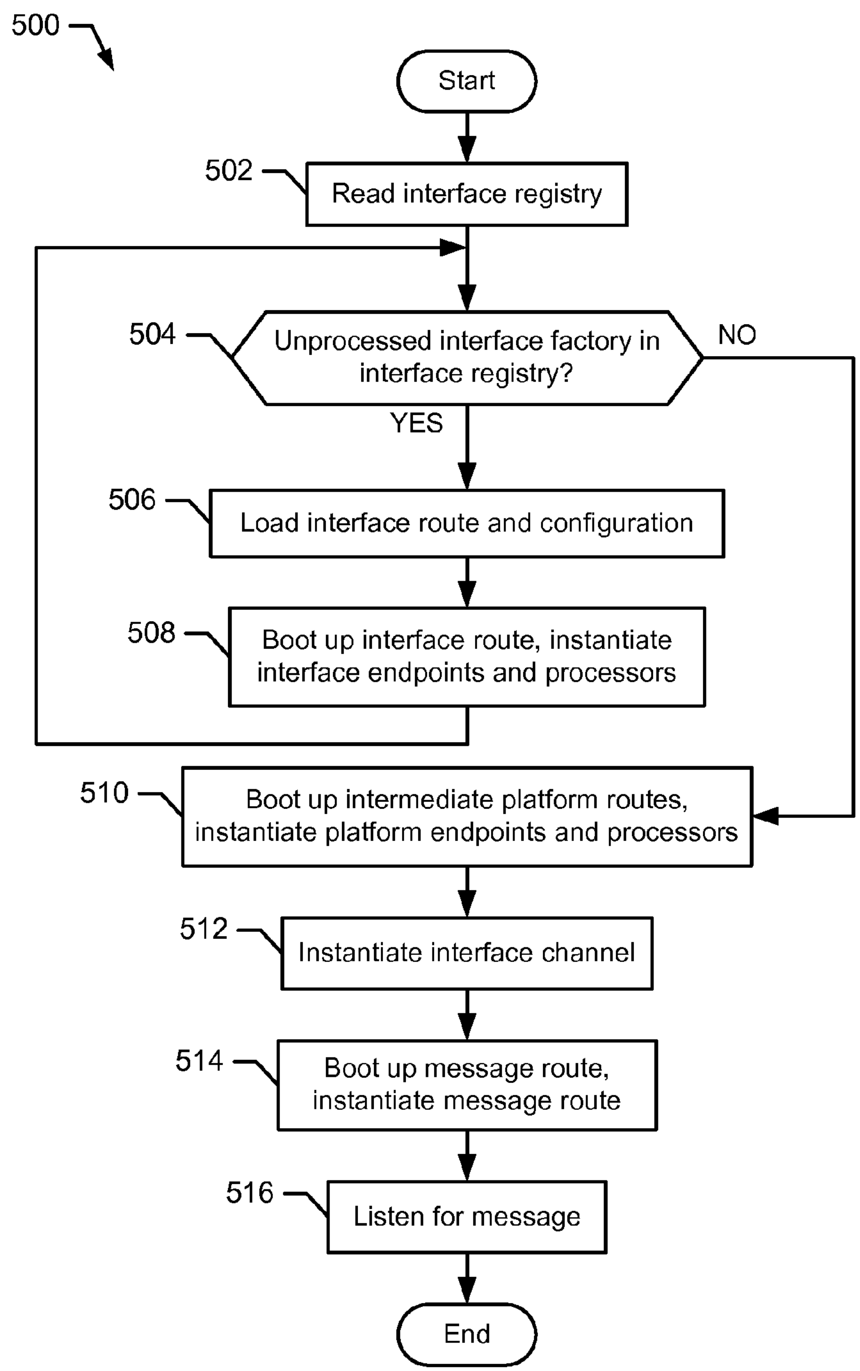
FIG. 5 illustrates a flow diagram of an example method of starting the product integrator of FIG. 2.

FIG. 5 illustrates a flow diagram of an example method 500 of starting the product integrator 102 of FIGS. 1 and 2. Initially, the integration platform 204 reads the interface registry 210 (block 502). The interface registry 210 may be, for example, stored in a cloud and/or other network storage service (e.g., the cloud 108 of FIGS. 1 and 2). The integration platform 204 determines if there are any unprocessed interface factories that have been published to the interface registry 210 (block 504). When new interfaces are provisioned, interface factories containing concrete instances of interface routes and configurations are published to the interface registry 210. Thus, the integration platform 204 determines if any interface factories associated with particular interfaces have been published to the interface registry 210 that have not yet been implemented (e.g., the associated interfaces have not yet been added to the product integrator 102). If there is an unprocessed interface factory in the interface registry 210, the integration platform 204 loads the concrete instances of the interface route and configuration and loads, for example, the configuration XML file (block 506). The integration platform 204 then boots up an interface route based on the interface route loaded from the interface factory, and instantiates the interface endpoints and processors to be used in sending messages (block 508). Control then returns to block 504. If there are no unprocessed interface factories in the interface registry, the integration platform 204 boots up the intermediate platform routes and instantiates the platform endpoints and processors (block 510). The integration platform 204 then instantiates the interface control channel (block 512). The integration platform boots up the message acquisition route and instantiates the message acquisition route (block 514). The integration platform 204 then listens on the message acquisition channel for a request message (block 516) sent from a healthcare information system.

Figure 6:
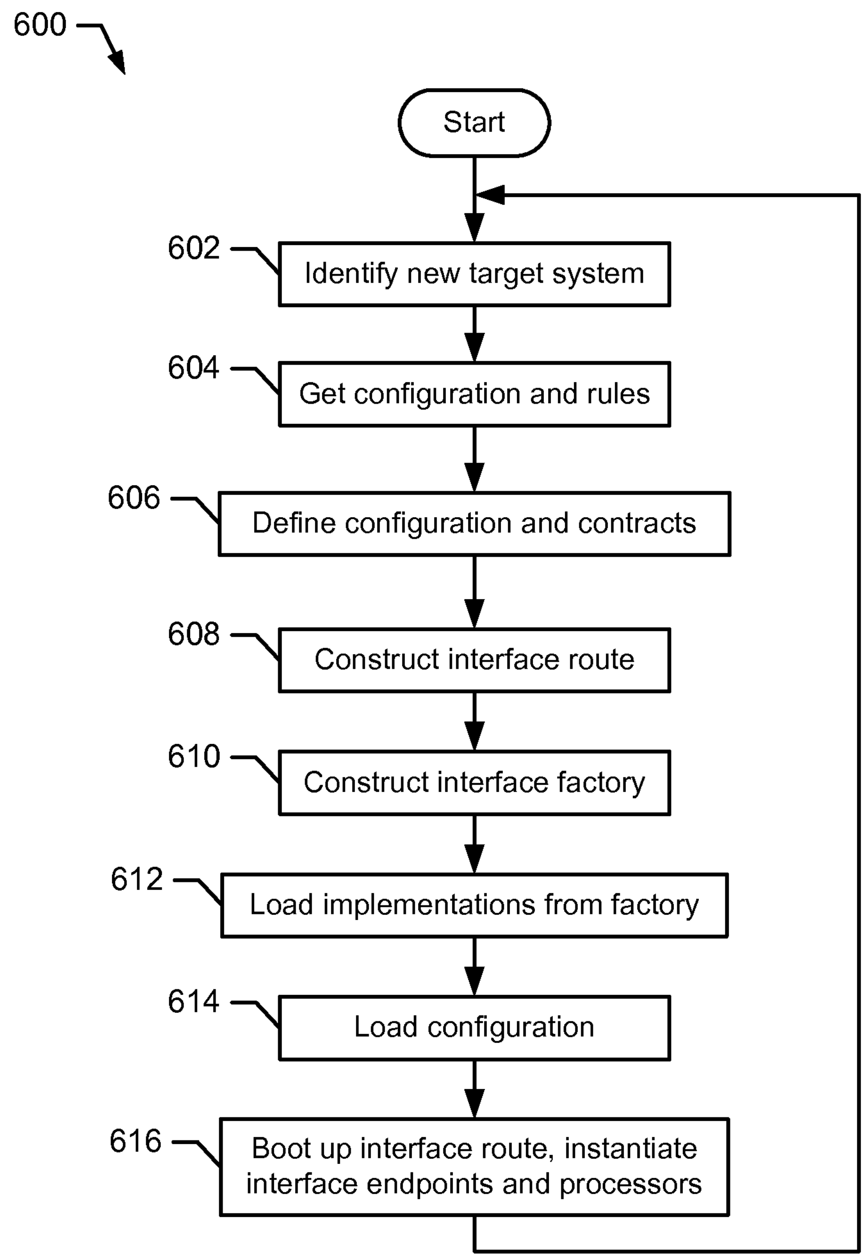
FIG. 6 illustrates a flow diagram of an example method of provisioning the interface of FIG. 3.

FIG. 6 illustrates a flow diagram of an example method 600 of provisioning the interface 206 of FIG. 2. The method 600 is used whenever a new healthcare system is added to the system 200 and an interface must be provisioned to allow communication between the product integrator 102 and the new healthcare system. Initially, the product integrator 102 identifies a new target healthcare system 202 (block 602). The interface 206 created for the new target healthcare system 202 identifies the interface configuration and any rules and/or protocol requirements that are associated with the target healthcare system 202 (block 604). The configuration elements and message contracts for the interface 206 is defined, for example, in XML (block 606). The interface 206 configuration is constructed (block 608) and the interface 206 route is constructed (block 610). An interface factory for the interface 206 is constructed that contains concrete implementations of the interface route and configuration (block 610). The interface factory classpath is passed to the interface control channel and the interface control channel loads the concrete implementations of the interface route and configuration from the interface factory (block 614). The configuration XML file may also be loaded. The interface route is booted up and the interface endpoints and processors are instantiated (block 616). Control then returns to block 602.

Figure 7:
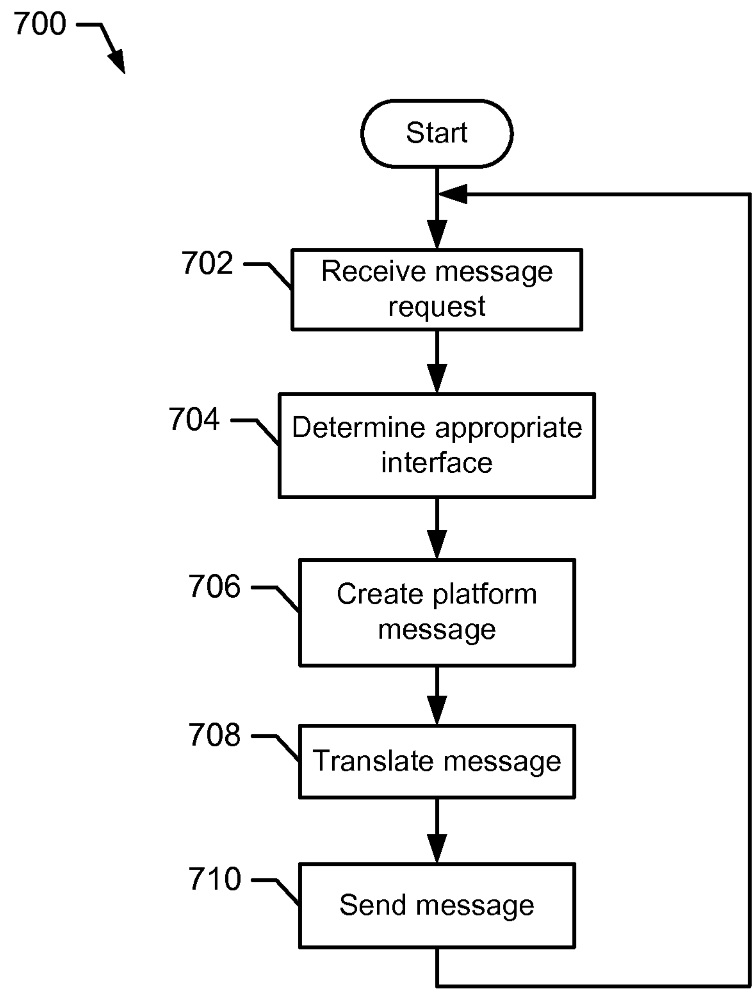
FIG. 7 illustrates a flow diagram of an example method of implementing the example product integrator of FIG. 2 to send messages.

FIG. 7 illustrates a flow diagram of an example method 700 of implementing the example product integrator 102 of FIG. 2 to send messages. Initially, the integration platform 204 receives a message request from a healthcare system 202 (block 702). The integration platform 204 determines an appropriate interface 206 to send the message to its intended recipient (block 704). Once the integration platform 204 has discovered the appropriate interface 206, the integration platform 204 converts the message request into a canonized platform message (block 706). The integration platform 204 also adds metadata to the platform message indicating the interface 206 as the intended message recipient. The integration platform 204 sends the platform message to the interface 206 and the interface 206 translates the message into a format appropriate for the target healthcare system 202 (block 708). The interface 206 sends the message to the target healthcare system 202 and control returns to block 702.

Figure 8:
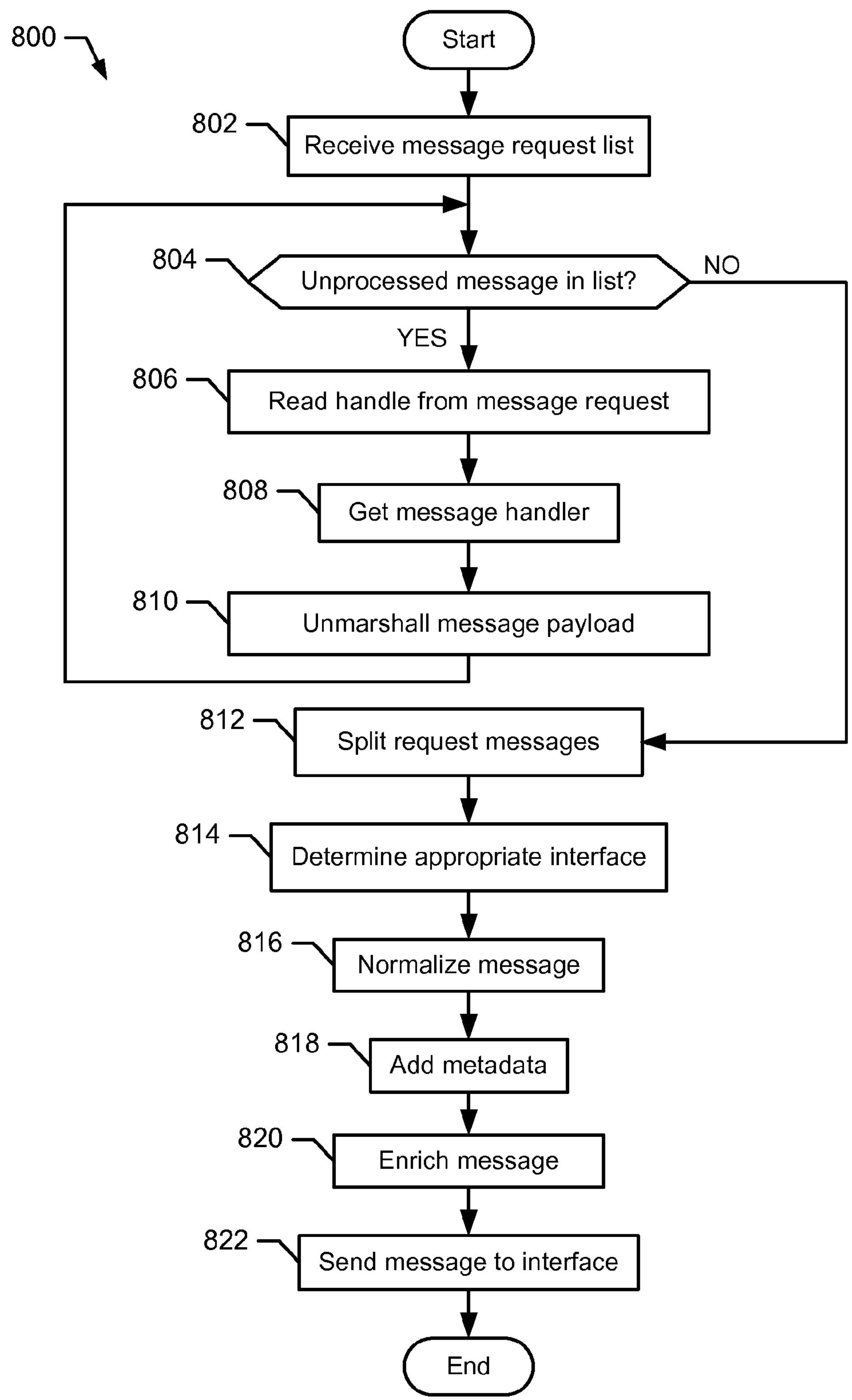
FIG. 8 illustrates a flow diagram of an example method of implementing the example integration platform of FIGS. 2 and 4 to send messages.

FIG. 8 illustrates a flow diagram of an example method 800 of implementing the example integration platform 204 of FIGS. 2 and 4 to send messages. Initially, the message acquirer 402 receives a message request list (e.g., a collection of request messages) from a source healthcare system 202. The message acquirer 402 reads the request messages from the platform message acquisition channel and determines if there are any unprocessed messages in the list (block 804). If there are unprocessed messages in the list, the message acquirer 402 reads the message handle from the message request (block 806). The message acquirer 402 then looks up the appropriate message handler (block 808) and unmarshalls the request message payload using the message handler (block 810). The message acquirer 402 may encapsulate the unmarshalled message object into a transient element of a request message. Control then returns to block 804. If there are no unprocessed messages in the message list, the message acquirer 402 splits the message list into individual message requests. The message acquirer 402 then determines (e.g., discovers) the appropriate interface 206 to be used for each message request based on the obtained message handler (block 814). The message acquirer 402 passes the message to the message normalizer 404 and the message normalizer 404 normalizes the message request into a canonical data format (e.g., a platform message) (block 816). The message normalizer 404 also adds metadata indicating the discovered interface 206 to the platform message (block 818). The message normalizer 404 passes the platform message to the content enricher 406 to enrich the content of the platform message (block 820). To enrich the platform message, the content enricher 406 determines if there are any callback service requests for the discovered interface 206 configuration. If a callback service request exists for the interface 206 configuration, the content enricher 406 sends the request(s) to the source healthcare system service layer 208 and/or other external partner system(s). The content enricher 406 enriches the platform message by adding the service layer 208 and/or the external partner system response(s) to the platform message. The enriched platform message is sent from the content enricher 406 to the message router 408. The message router 408 may filter out unwanted messages based on rules associated with the discovered interface 206. The message router 408 then sends the message to the interface 206 (block 822). To send the message to the interface 206, the message router 408 adapts the enriched platform message into the message format expected by the discovered interface 206 and examines the message content and any conditional preferences for the interface 206. The message router 408 then routes the message to the interface message channel of the interface 206.

Figure 9:
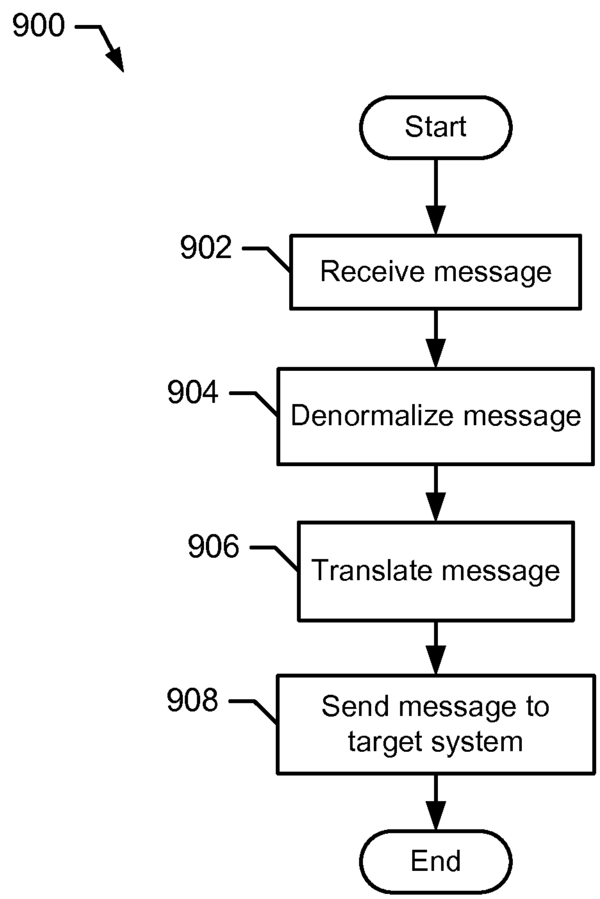
FIG. 9 illustrates a flow diagram of an example method of implementing the example interface of FIGS. 2 and 3 to send messages.

FIG. 9 illustrates a flow diagram of an example method 900 of implementing the example interface 206 of FIGS. 2 and 3 to send messages. Initially, the interface message normalizer 304 receives the message from the integration platform 204 via the interface message channel (block 902). The interface message normalizer 304 denormalizes the platform message (e.g., the message is in a canonical data format) into the interface 206 request message format (block 904) and sends the message to the message translator 306. The message translator 306 translates the message from the interface 206 message format to the target healthcare system 202 format (block 906). The message translator 306 sends the target healthcare system 202 request message to the target healthcare system 202 (block 908).

Figure 10:
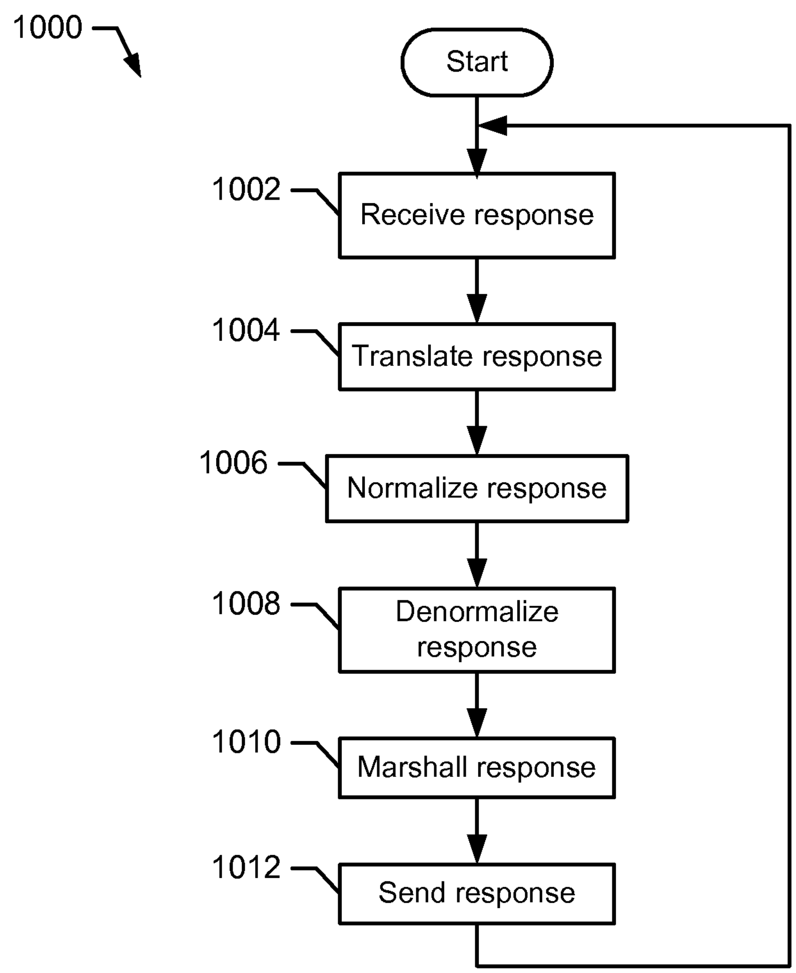
FIG. 10 illustrates a flow diagram of an example method of implementing the example product integrator of FIG. 2 to receive response messages.

FIG. 10 illustrates a flow diagram of an example method 1000 of implementing the example product integrator 102 of FIG. 2 to receive response messages. The target healthcare system 202 generates a response message and the associated interface 206 receives the response message from the target healthcare system 202 (block 1002). The interface 206 translates the message from the target healthcare system 202 response format into the interface 206 response message format (block 1004). The interface 206 normalizes the interface 206 response message into a response platform message (e.g., in a canonical data format) (block 1006) and sends the response platform message to the integration platform 204. The integration platform 204 receives the response platform message and denormalizes the response platform message into the response message format for the source healthcare system 202 (block 1008). The integration platform 204 then marshalls the response message payload (block 1010). If multiple response messages have been sent to the integration platform 204, the integration platform 204 may aggregate the response messages. The integration platform 204 sends the response message(s) to the source healthcare system 202. Control then returns to block 1002. For example, a source healthcare system may use the product integrator 102 to send a message to a target healthcare system request authorization to perform some action. In such an example, the target healthcare system may generate a response granting authorization of the request and the product integrator 102 is used to pass this authorization response back to the source healthcare system.

Figure 11:
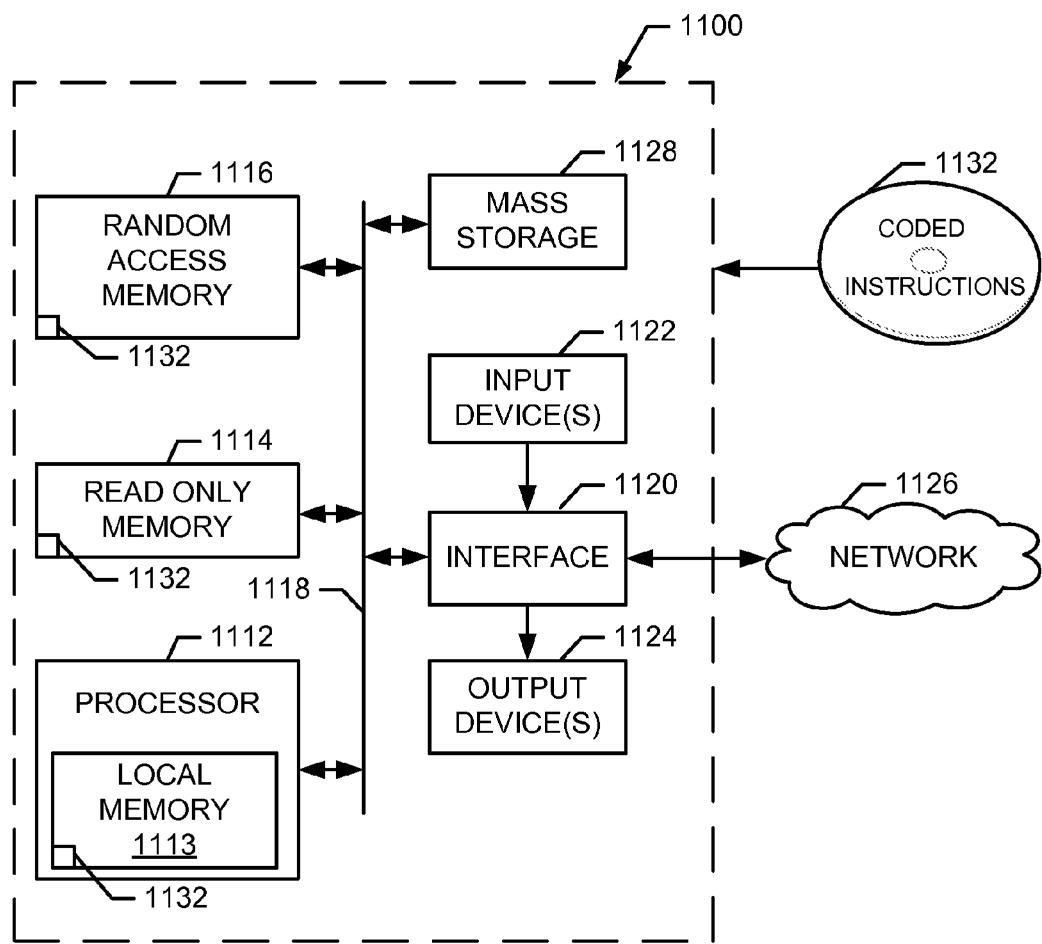
FIG. 11 is a block diagram of an example processor platform that may be used to execute the instructions of FIGS. 5-10 to implement the example product integrators of FIGS. 1 and 2, the example interface of FIG. 3, the example integration platform of FIG. 4, and/or, more generally, the example systems of FIGS. 1 and 2.

FIG. 11 is a block diagram of an example processor platform 1100 capable of executing the instructions of FIGS. 5, 6, 7, 8, 9, and/or 10 to implement the example product integrator 102 of FIGS. 1 and/or 2, the example interface 206 of FIG. 3, the example integration platform 204 of FIG. 4, and/or, more generally, the systems 100 and 200 of FIGS. 1 and/or 2. The processor platform 1100 can be, for example, a server, a personal computer, an Internet appliance, a set top box, or any other type of computing device.

The system 1100 of the instant example includes a processor 1112. For example, the processor 1112 can be implemented by one or more microprocessors or controllers from any desired family or manufacturer.

The processor 1112 includes a local memory 1113 (e.g., a cache) and is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1100 also includes an interface circuit 1120. The interface circuit 1120 may be implemented by any type of interface standard, such as an Ethernet interface, a USB, and/or a PCI express interface.

One or more input devices 1122 are connected to the interface circuit 1120. The input device(s) 1122 permit a user to enter data and commands into the processor 1112. The input device(s) can be implemented by, for example, a keyboard, a mouse, a touchscreen, a track-pad, and/or a trackball.

One or more output devices 1124 are also connected to the interface circuit 1120. The output devices 1124 can be implemented, for example, by display devices (e.g., a liquid crystal display, a cathode ray tube display (CRT), a printer and/or speakers). The interface circuit 1120, thus, typically includes a graphics driver card.

The interface circuit 1120 also includes a communication device such as a modem or network interface card to facilitate exchange of data with external computers via a network 1126 (e.g., an Ethernet connection, a DSL, a telephone line, coaxial cable, a cellular telephone system, etc.).

The processor platform 1100 also includes one or more mass storage devices 1128 for storing software and data. Examples of such mass storage devices 1228 include floppy disk drives, hard drive disks, compact disk drives and DVD drives. The mass storage device 1128 may implement a local storage device.

The coded instructions 1132 of FIGS. 5, 6, 7, 8, 9, and/or 10 may be stored in the mass storage device 1128, in the volatile memory 1114, in the non-volatile memory 1116, and/or on a removable storage medium such as a CD or DVD.

Although certain example methods, systems, apparatus, and articles of manufacture have been described herein, the scope of coverage of this patent is not limited thereto. On the contrary, this patent covers all methods, systems and articles of manufacture fairly falling within the scope of the claims of this patent.

The invention claimed is:

1. A computer-implemented method to mediate messages in a product integration platform, said method comprising:

receiving, using a processor in the product integration platform, a message request from a source healthcare system, the message request containing a message payload and formatted according to a source healthcare system format;

determining and deploying, using the processor, an interface to be used to route the message from the source healthcare system to a target healthcare system, the interface selected from among a plurality of interfaces based on the source healthcare system and the target healthcare systems, the interface associated with configuration information specifying a platform message format for the interface and a relationship to the source healthcare system format and a target healthcare system format, the configuration information used to dynamically instantiate the interface between the source healthcare system and the target healthcare system;

creating, using the processor, a platform message based on the message request;

adapting, using the processor, the platform message into the platform message format expected by the interface; and routing, using the processor, the platform message to the interface for transmission to the target healthcare system, the configuration information associated with the interface providing instructions for converting the platform message to the target healthcare system format.

2. The method of claim 1, further comprising:

determining if a message request in a list of request messages is unprocessed; and if a message request is unprocessed:

determining a message handler for the request message based on a handle contained in the request message; and unmarshalling the message payload of the request message.

3. The method of claim 2, further comprising filtering out unwanted message requests based on rules associated with the target healthcare system.

4. The method of claim 1, wherein creating a platform message comprises:

normalizing the message request into a canonical data format; and adding metadata to the message request indicating the interface to be used in the message routing.

5. The method of claim 1, further comprising enriching the platform message by:

determining if there is a callback service request for the interface to be used in the message routing; and if there is a callback service request for the interface:

sending a request to at least one of the source healthcare system and an external partner system;

receiving additional content from the at least one of the source healthcare system and external partner system in response to the request; and adding the additional content to the platform message.

6. The method of claim 1, further comprising:

receiving a platform response message from the interface, wherein the platform response message is in a canonical data format, and wherein the platform response message includes a response message payload;

denormalizing the platform response message into a response message format for the source healthcare system;

marshalling the response message payload; and sending the response message to the source healthcare system.

7. The method of claim 6, further comprising:

aggregating a plurality of response messages; and sending the aggregated response messages to the source healthcare system.

8. A system to mediate messages in a product integration platform, said system comprising:

a processor configured to execute instructions to implement the particular system including:

a message acquirer to:

receive a message request from a source healthcare system, the message request containing a message payload and formatted according to a source healthcare system format; and determine and deploy an interface to be used to route the message from the source healthcare system to a target healthcare system, the interface selected from among a plurality of interfaces based on the source healthcare system and the target healthcare systems, the interface associated with configuration information specifying a platform message format for the interface and a relationship to the source healthcare system format and a target healthcare system format, the configuration information used to dynamically instantiate the interface between the source healthcare system and the target healthcare system;

a message normalizer to:

create a platform message based on the message request; and adapt the platform message into the platform message format expected by the interface; and a message router to route the platform message to the interface for transmission to the target healthcare system, the configuration information associated with the interface providing instructions for converting the platform message to the target healthcare system format.

9. The system of claim 8, wherein the message acquirer determines if a message request in a list of request messages is unprocessed; and if a message request is unprocessed:

determines a message handler for the request message based on a handle contained in the request message; and unmarshalls the message payload of the request message.

10. The system of claim 9, wherein the message router splits the list of request messages into separate message requests.

11. The system of claim 9, wherein the message router filters out unwanted message requests based on rules associated with the target healthcare system.

12. The system of claim 8, wherein creating a platform message comprises:

normalizing the message request into a canonical data format; and adding metadata to the message request indicating the interface to be used in the message routing.

13. The system of claim 8, further comprising a content enricher to enrich the platform message by:

determining if there is a callback service request for the interface to be used in the message routing; and if there is a callback service request for the interface:

sending a request to at least one of the source healthcare system and an external partner system;

receiving additional content from the at least one of the source healthcare system and external partner system in response to the request; and adding the additional content to the platform message.

14. The system of claim 8, wherein the message router receives a platform response message from the interface, the platform response message being in a canonical data format, and wherein the platform response message includes a response message payload; the message normalizer denormalizes the platform response message into a response message format for the source healthcare system; and the message acquirer marshalls the response message payload and sends the response message to the source healthcare system.

15. The system of claim 14, wherein the message acquirer aggregates a plurality of response messages and sends the aggregated response messages to the source healthcare system.

16. A non-transitory computer-readable storage medium comprising instructions that, when executed, cause a computing device to at least:

receive a message request from a source healthcare system, the message request containing a message payload and formatted according to a source healthcare system format;

determine and deploy an interface to be used to route the message from the source healthcare system to a target healthcare system, the interface selected from among a plurality of interfaces based on the source healthcare system and the target healthcare systems, the interface associated with configuration information specifying a platform message format for the interface and a relationship to the source healthcare system format and a target healthcare system format, the configuration information used to dynamically instantiate the interface between the source healthcare system and the target healthcare system;

create a platform message based on the message request;

adapt the platform message into the platform message format expected by the interface; and route the platform message to the interface for transmission to the target healthcare system, the configuration information associated with the interface providing instructions for converting the platform message to the target healthcare system format.

17. A non-transitory computer-readable storage medium of claim 16, further comprising instructions that cause the computing device to:

determine if a message request in a list of request messages is unprocessed; and if a message request is unprocessed:

determine a message handler for the request message based on a handle contained in the request message; and unmarshall the message payload of the request message.

18. A non-transitory computer-readable storage medium of claim 16, wherein creating a platform message comprises:

normalizing the message request into a canonical data format; and adding metadata to the message request indicating the interface to be used in the message routing.

19. A non-transitory computer-readable storage medium of claim 16, further comprising instructions that cause the computing device to enrich the platform message by:

determining if there is a callback service request for the interface to be used in the message routing; and if there is a callback service request for the interface:

sending a request to at least one of the source healthcare system and an external partner system;

receiving additional content from the at least one of the source healthcare system and external partner system in response to the request; and adding the additional content to the platform message.

20. A non-transitory computer-readable storage medium of claim 16, further comprising instructions that cause the computing device to filter out unwanted message requests based on rules associated with the target healthcare system.

21. A non-transitory computer-readable storage medium of claim 16, further comprising instructions that cause the computing device to:

receive a platform response message from the interface, wherein the platform response message is in a canonical data format, and wherein the platform response message includes a response message payload;

denormalize the platform response message into a response message format for the source healthcare system;

marshall the response message payload; and send the response message to the source healthcare system.

22. A non-transitory computer-readable storage medium of claim 21, further comprising instructions that cause the computing device to:

aggregate a plurality of response messages; and send the aggregated response messages to the source healthcare system.

* * * * *